US008978022B2

(12) United States Patent
Kalogeropulos et al.

(10) Patent No.: US 8,978,022 B2
(45) Date of Patent: Mar. 10, 2015

(54) REDUCING INSTRUCTION MISS PENALTIES IN APPLICATIONS

(71) Applicant: Oracle International Corporation, Redwood City, CA (US)

(72) Inventors: Spiros Kalogeropulos, Los Gatos, CA (US); Partha Tirumalai, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 101 days.

(21) Appl. No.: 13/738,811

(22) Filed: Jan. 10, 2013

(65) Prior Publication Data

US 2014/0195788 A1 Jul. 10, 2014

(51) Int. Cl.
*G06F 12/08* (2006.01)
*G06F 9/38* (2006.01)
*G06F 12/00* (2006.01)

(52) U.S. Cl.
CPC ................... *G06F 9/3861* (2013.01)
USPC ........... 717/151; 712/237; 712/207; 711/137; 711/125

(58) Field of Classification Search
None
See application file for complete search history.

(56) References Cited

U.S. PATENT DOCUMENTS

| 5,586,295 | A * | 12/1996 | Tran ............................ 711/137 |
| 6,047,359 | A * | 4/2000 | Fouts ........................... 711/137 |
| 6,658,534 | B1 * | 12/2003 | White et al. .................. 711/137 |
| 6,848,029 | B2 * | 1/2005 | Coldewey ...................... 711/137 |
| 7,487,296 | B1 * | 2/2009 | Iacobovici et al. ........... 711/137 |
| 8,146,064 | B2 * | 3/2012 | Chen et al. .................... 717/141 |
| 8,166,251 | B2 * | 4/2012 | Luttrell ......................... 711/137 |
| 8,347,039 | B2 * | 1/2013 | Boyle et al. ................... 711/137 |
| 8,392,578 | B1 * | 3/2013 | Donovan et al. ............. 709/227 |
| 2003/0088863 | A1 * | 5/2003 | Tirumalai et al. ............. 717/158 |
| 2007/0083856 | A1 * | 4/2007 | Chilimbi et al. .............. 717/128 |
| 2010/0268892 | A1 * | 10/2010 | Luttrell ......................... 711/137 |
| 2011/0264862 | A1 * | 10/2011 | Karlsson et al. ............. 711/125 |

\* cited by examiner

*Primary Examiner* — Don Wong
*Assistant Examiner* — Devayani R Talukdar
(74) *Attorney, Agent, or Firm* — Marsh Fischmann & Breyfogle LLP; Daniel J. Sherwinter

(57) ABSTRACT

Embodiments include systems and methods for reducing instruction cache miss penalties during application execution. Application code is profiled to determine "hot" code regions likely to experience instruction cache miss penalties. The application code can be linearized into a set of traces that include the hot code regions. Embodiments traverse the traces in reverse, keeping track of instruction scheduling information, to determine where an accumulated instruction latency covered by the code blocks exceeds an amount of latency that can be covered by prefetching. Each time the accumulated latency exceeds the amount of latency that can be covered by prefetching, a prefetch instruction can be scheduled in the application code. Some embodiments insert additional prefetches, merge prefetches, and/or adjust placement of prefetches to account for scenarios, such as loops, merging or forking branches, edge confidence values, etc.

20 Claims, 7 Drawing Sheets

REDUCING INSTRUCTION MISS PENALTIES IN APPLICATIONS

FIELD

Embodiments relate generally to application execution optimization, and, more particularly, to reduction of application instruction miss penalties associated with application execution.

BACKGROUND

Execution of applications in a computational environment typically involves fetching of application instructions into an instruction cache associated with a processor of the computational environment. Many applications are too large and/or instruction cache is too small to fetch all the application instructions into cache at one time. Accordingly, techniques are used to determine which instructions to fetch into cache, which to remove from cache, etc. For example, some processors include hardware prefetch functionality that looks down an instruction stream as the application executes and attempts to identify and prefetch future instructions in the stream.

In many large commercial applications, it is difficult to accurately predict which instructions will be executed in which order at runtime. For example, typical applications include many branch points in the application code, so that execution of the application can proceed in many different ways. These types of difficulties tend to limit the effectiveness of traditional hardware prefetching techniques, which can result in a high rate of instructions not being available in cache when needed ("instruction cache misses"). Execution of instructions that are not available in cache can involve retrieving the instructions from the main memory or the like, which can appreciably slow down execution of the application ("an instruction cache miss penalty"). Instruction cache misses can also reduce the effectiveness of certain types of optimizations, such as out-of-order application execution.

BRIEF SUMMARY

Among other things, embodiments provide novel systems and methods for reducing instruction cache miss penalties. Embodiments operate in context of a compiler, binary optimizer, or the like. Application code is profiled to determine "hot" code regions (e.g., code blocks, functions, traces, etc.) likely to experience instruction cache miss penalties. For example, manual, automatic, and/or empirical techniques identify code regions having a high likelihood of execution at application runtime. If the code region is more likely to be executed, it can also be more likely to experience instruction cache miss penalties. The application code can be linearized into a set of traces that include the hot code regions. Each trace includes chunks of instructions determined according to a prefetch chunk size. Embodiments traverse the traces in reverse (e.g., instruction by instruction from an exit point of a trace), keeping track of an estimated execution time of the traversed code blocks, until an accumulated estimated execution time of the code blocks preceding the start of an instruction chunk exceeds an expected instruction prefetch execution time to prefetch the instructions from that chunk. Each time the accumulated estimated execution time exceeds the expected instruction prefetch execution time, a prefetch instruction can be added to the application code. Some embodiments insert additional prefetches, merge prefetches, and/or adjust placement of prefetches to account for characteristics of the code (e.g., loops, merging branches, edge confidence values, etc.).

According to one set of embodiments, a system is provided for reducing instruction cache miss penalties in application code execution. The system includes a computer-implemented code profiler and a computer-implemented prefetcher. The computer-implemented code profiler is operable to: determine an instruction cache miss penalty for each of a number of code sections of application code, the instruction cache miss penalty indicating a likelihood that execution of the corresponding code section in the target execution environment will result in an instruction cache miss; and generate execution traces from the application code, each execution trace comprising at least one of the code sections. The computer-implemented prefetcher is in communication with the computer-implemented code profiler, and is operable, for each execution trace having a code section with a corresponding instruction cache miss penalty that exceeds a predetermined penalty threshold, to: traverse a set of code blocks of the execution trace in reverse starting from a source code block of the execution trace until an accumulated instruction latency exceeds a prefetch latency by, for each of the set of code blocks, adding a latency covered by the code block to latencies of previously traversed code blocks of the set of code blocks to calculate the accumulated instruction latency, the prefetch latency corresponding to a predicted time to prefetch into an instruction cache a number of code blocks defined by a prefetch chunk size; and insert a prefetch instruction ahead of a last-traversed code block in the execution trace when the accumulated instruction latency exceeds the prefetch latency.

According to another set of embodiments, a computer-implemented method is provided for reducing instruction cache miss penalties in application code execution. The method includes: determining an instruction cache miss penalty for each of a number of code sections of application code, the instruction cache miss penalty indicating a likelihood that execution of the corresponding code section will result in an instruction cache miss; generating execution traces from the application code, each execution trace comprising at least one of the code sections; determining a prefetch latency corresponding to a predicted time to prefetch into an instruction cache a number of code blocks defined by a prefetch chunk size according to a target execution environment for the application code; and for each execution trace having a code section with a corresponding instruction cache miss penalty that exceeds a predetermined penalty threshold: traversing a set of code blocks of the execution trace in reverse starting from a source code block of the execution trace until an accumulated instruction latency exceeds the prefetch latency by, for each of the set of code blocks, adding a latency covered by the code block to latencies of previously traversed code blocks of the set of code blocks to calculate the accumulated instruction latency; and inserting a prefetch instruction ahead of a last-traversed code block in the execution trace when the accumulated instruction latency exceeds the prefetch latency.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
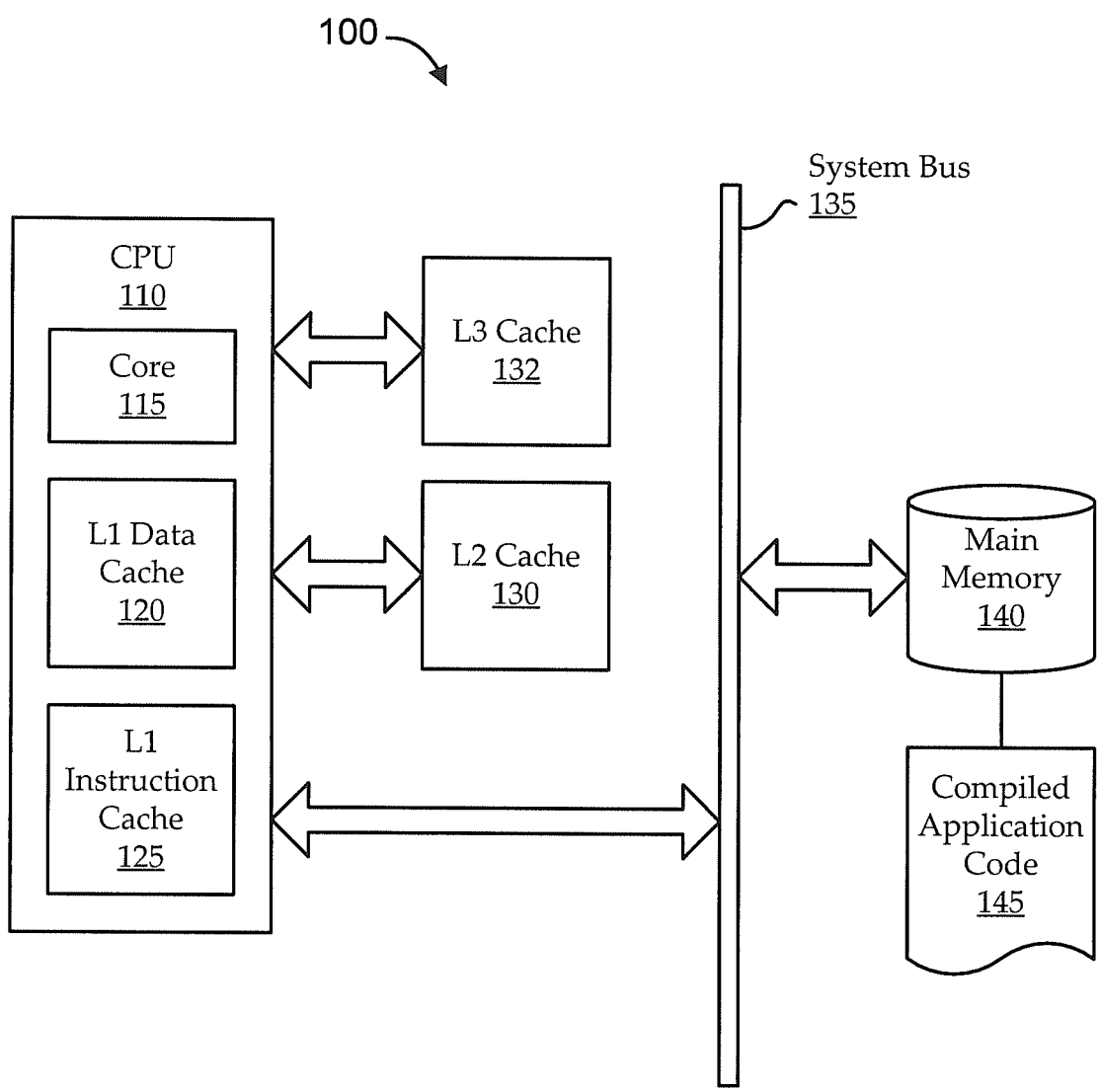
FIG. 1 shows a block diagram of an illustrative system that provides a context for various embodiments.

Turning first to FIG. 1, a block diagram is shown of an illustrative system 100 that provides a context for various embodiments. The system 100 includes a central processing unit (CPU) 110 having a core 115, level 1 (L1) data cache 120, and L1 instruction cache 125. The CPU 110 is in communication (e.g., over a relatively very high speed bus) with one or more additional levels of cache. For example, the system 100 is illustrated as including a level 2 (L2) cache 130 and a level 3 (L3) cache 132. The CPU 110 is also in communication with a main memory 140 (e.g., one or more data storage devices, like hard-disk drives, solid state drives, etc.) over a system bus 135.

The L1 instruction cache 125 typically has the smallest capacity, followed by the L2 cache 130, the L3 cache 132, and the main memory 140 (which has the largest capacity). However, the L1 instruction cache 125 also typically provides the fastest data access with respect to the CPU 110, followed by the L2 cache 130, the L3 cache 132, and the main memory 140 (which has the slowest data access). As illustrated, compiled application code 145 is stored in main memory 140. It is assumed that the compiled application code 145 is larger than an instruction cache capacity, so that the entire application cannot be executed from cache. As used herein, "instruction cache" and the like can refer to any cache at any level that is used by the system architecture to cache instruction data prior to execution. In some implementations, the instruction cache includes the combined capacities of the L1 instruction cache 125 and the L2 cache 130. In other implementations, the L1 instruction cache 125 information is also included in L2 cache 130, so that L2 cache 130 capacity can be used as a determinant of instruction cache capacity. In still other implementations, multiple threads share the instruction cache, such that each of n threads has an effective 1/nth of the instruction cache capacity for its use.

As the CPU 110 executes application instructions from the compiled application code 145, at least some of the instructions are retrieved from main memory 140. If the CPU 110 were to wait to retrieve instructions from main memory 140 until it was ready to execute the instruction, the application could be appreciably delayed due to latencies involved in the retrieval. Accordingly, the CPU 110 attempts to prefetch portions of the instructions into cache (e.g., L1 instruction cache 125 or L2 cache 130) so they are available closer to the CPU 110 when it is time to execute them.

The prefetching is traditionally performed in hardware by an application processor (e.g., CPU 110) programmed to determine which instructions to fetch into cache by looking down the instruction stream of the compiled application code 145 as the application executes. Typical complexities of large applications tend to limit the effectiveness of traditional hardware prefetching techniques, which can result in a high rate of instructions not being available in cache when needed ("instruction cache misses"). If the instruction is not available when needed, the CPU 110 retrieves the instruction from farther away (e.g., main memory 140 or even L3 cache 132), which can add appreciable delay. Accordingly, instruction cache misses can manifest as an appreciable slowing of application execution and can also reduce the effectiveness of certain types of optimizations, such as out-of-order application execution.

With applications growing larger, virtualized execution environments becoming more ubiquitous, and other developments, the potential impacts of instruction cache misses on application execution has become appreciable. Some traditional instruction prefetching techniques are effective in looking a short distance down the instruction stream. Even with high branch prediction accuracy, however, predicting far down the stream becomes ineffective in typical commercial applications that have frequent branches (e.g., 1 in 5 instructions could be a branch). Traditional techniques can also be limited where instruction cache misses are addressed by fetching instructions from caches or memory that is relatively far away (e.g., greater than 25 to 50 CPU clocks).

Embodiments described herein provide novel systems and methods for reducing instruction cache miss penalties. Application code is profiled to determine "hot" code regions likely to experience instruction cache miss penalties. The application code can be linearized into a set of traces that include the hot code regions. Each trace includes chunks of instructions (e.g., sets of sequential instructions in the trace), the number of instructions in each chunk determined according to a prefetch chunk size (e.g., a number of bytes of instructions that can be prefetched with a single prefetch instruction). For example, if a single cache line (e.g., of L1 instruction cache 125 or L2 cache 130) is 64 bytes, the prefetch chunk size can be determined as 64 bytes. If each instruction is four bytes, each instruction chunk can be determined as sixteen instructions (i.e., 64 bytes per cache line divided by four bytes per instruction equals sixteen instructions per cache line).

Embodiments traverse the traces in reverse (e.g., instruction by instruction from an exit point of a trace), keeping track of an estimated execution time of the traversed code blocks, until an accumulated estimated execution time of the code blocks preceding the start of an instruction chunk exceeds an expected instruction prefetch execution time to prefetch the instructions from that chunk. Each time the accumulated estimated execution time exceeds the expected instruction prefetch execution time, a prefetch instruction can be added to the application code. For example, if a prefetch instruction takes 600 cycles to prefetch a target instruction chunk into cache, the prefetch instruction can be scheduled at least 600 cycles in ahead of the target instructions chunk in the application code. Some embodiments insert additional prefetches, merge prefetches, and/or adjust placement of prefetches to account for characteristics of the code (e.g., loops, merging branches, edge confidence values, etc.).

Figure 2:
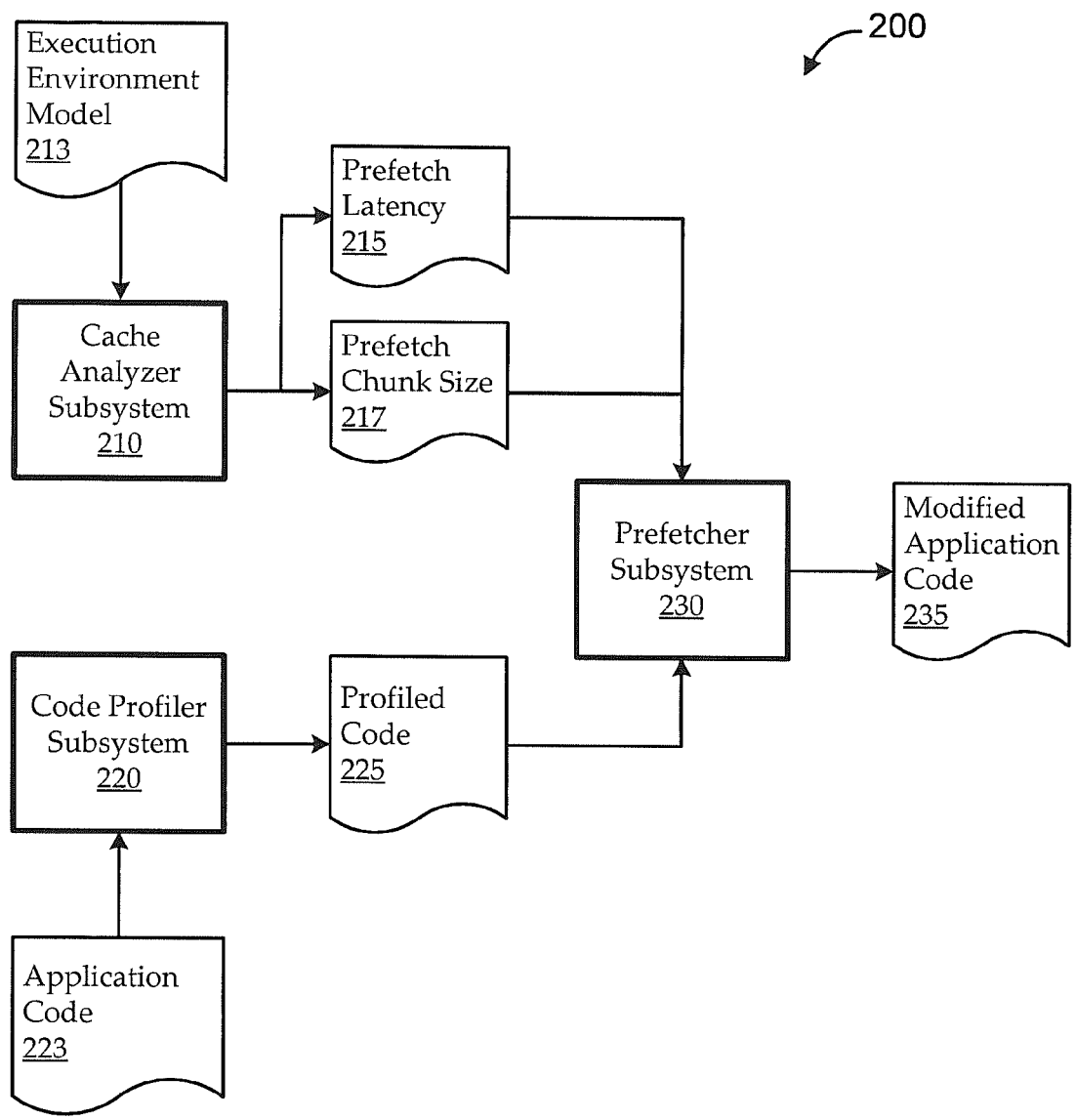
FIG. 2 shows a block diagram of an illustrative system for reducing instruction cache miss penalties, according to various embodiments.

FIG. 2 shows a block diagram of an illustrative system 200 for reducing instruction cache miss penalties, according to various embodiments. The system 200 includes a code profiler subsystem 220 in communication with a prefetcher subsystem 230. Some embodiments further include a cache analyzer subsystem 210 in communication with the prefetcher subsystem 230. Embodiments receive application code 223 (e.g., un-compiled code or code run through a binary optimizer or the like) at the code profiler subsystem 220. The code profiler subsystem 220 profiles the code to identify code regions (e.g., code blocks, execution traces, etc.) that are likely to experience instruction cache misses and/or result in undesirable instruction cache miss penalties. The profiled code is communicated to the prefetcher subsystem 230, which schedules prefetches within the application code 223 at appropriate locations to reduce instruction cache miss penalties, and outputs modified application code 235. The prefetch scheduling can be performed according to information about the application execution environment generated by and/or received from the cache analyzer subsystem 210 (e.g., prefetch latency, prefetch chunk size, etc.).

Embodiments of the code profiler subsystem 220 can provide various functionality to support profiling of the received application code 223 into profiled code 225. In some implementations, the code profiler subsystem 220 includes one or more hardware counter-based profiling mechanisms, or the like. Typical CPU's can have hundreds or thousands of hardware counter-based profiling mechanisms that can provide information, such as where (e.g., in relation to which code blocks) instruction cache misses occur and how often. The hardware counter-based profiling data can then be used to predict expected instruction cache miss penalties (e.g., by code block), which can indicate code regions that would benefit from using prefetching to reduce those instruction cache miss penalties. For example, code regions identified by the hardware counter-based profiling mechanisms as experiencing above a certain threshold of instruction cache miss penalty (e.g., a certain threshold probability that an instruction cache miss will occur, a certain threshold number of instruction cache misses, a certain threshold penalty (e.g., delay) likely to result from instruction cache misses, etc.) can be identified as "hot" code regions. Alternatively, code regions identified by the hardware counter-based profiling mechanisms as experiencing below a certain threshold of instruction cache miss penalty can be identified as "cold" code regions.

In other implementations, the code profiler subsystem 220 identifies applicable (e.g., "hot") code regions according to user provided information. Source annotations, options, and or other information provided by the user during the build process can indicate which code regions are likely to experience instruction cache misses. A user can mark functions that are to be targeted for instruction prefetching, explicitly request instruction prefetches with a directive (e.g. "#pragma sparc_instruction_prefetch(label)"), and/or otherwise indicate applicable portions of the application. For example, a user that programmed the application (a "programmer user") has insight into the overall architecture and functionality of the application, and can include source annotations in the application code 223 that indicate that a particular function is likely to be executed whenever the application is executed (e.g., a core function of the application) or that a particular function is unlikely to be executed when the application is executed (e.g., a function that handles an error or fault condition, etc.). User indications can be explicit (e.g., source annotations) or implicit. Further, the code can be profiled solely according to the user indications or partially according to the user indications. For example, other techniques can be used to score potential candidates for prefetching optimization, and the user indications can be applied to the scores as an additional weighting factor. Alternatively, the user indicated code regions can all be profiled as "hot" code regions, and additional regions are also identified using other techniques.

In still other implementations, the code profiler subsystem 220 uses training runs and/or past execution for the application code 223 to generate the profiled code 225 (e.g., using feedback-directed optimization (FDO) techniques). In one implementation, the application code 223 is executed using training input, and profile information is collected during execution of the application code 223 to detect applicable (e.g., "hot") code regions. For example, it may be determined that twenty percent of the code blocks are executed eighty percent of the time. Accordingly, over multiple application runs, those twenty percent of the code blocks have an appreciably higher likelihood of experiencing instruction cache misses.

Other implementations of the code profiler subsystem 220 can profile the application code 223 into profiled code 225 in any other suitable manner. The generated profiled code 225 can include any useful information for indicating "hot" or "cold" code regions (e.g., by code block, logical function, branch, etc.). The profiled code 225 can also include additional information that can be used by the prefetcher subsystem 230, such as control flow graph information, function call graph information, edge probabilities (i.e., probabilities that particular paths will be taken by the application during execution where the application code 223 branches), etc.

Embodiments of the prefetcher subsystem 230 schedule prefetches according to the profiled code 225 to generate modified application code 235 intended to execute with reduced instruction cache miss penalties. Certain determinations of the prefetcher subsystem 230 depend on prefetch capabilities and/or limitations of an actual or assumed execution environment for the application (e.g., like the one illustrated in FIG. 1), such as its prefetch latency 215 (e.g., prefetch instruction execution time or a latency derived therefrom), prefetch chunk size 217, etc. For example, the amount of instruction data that can be prefetched into cache with a single prefetch instruction (i.e., the prefetch chunk size 217) can be a direct function of cache line sizes and/or other cache properties. Similarly, the prefetch latency 215 can be a direct function of the amounts and types of cache available for use as instruction cache, bus speeds, clock speeds, etc.

In some implementations, the prefetch latency 215 and/or prefetch chunk size 217 are coded into the compile environment (e.g., as default, hard-coded, or manually selectable data). In other implementations, the cache analyzer subsystem 210 calculates or identifies the prefetch latency 215 and/or prefetch chunk size 217 according to an execution environment model 213 (e.g., a dynamic environment). The execution environment model 213 can be any suitable description of one or more characteristics of the actual or assumed execution environment for the application (e.g., a user-selectable list of computational environments, each with associated cache sizes, etc.). The prefetch latency 215 and prefetch chunk size 217 can be expressed or treated according to any suitable unit or measurement type, including, for example, in numbers of instruction chunks, code blocks, functions, bytes, etc. For example, the prefetch chunk size 217 can indicate that the effective instruction cache can support prefetching of sixty-four bytes at a time, sixteen instructions (of four-bytes each) at a time, etc.

Some embodiments of the prefetcher subsystem 230 determine whether or not prefetching optimization should be performed for a particular code region, for a group of code regions, or even for the entire application. For example, where hardware counter-based profiling mechanisms are available in the code profiler subsystem 220, the instruction cache miss penalties can be directly measured and/or calculated. If the instruction cache miss penalty is below a certain threshold (e.g., 5%), prefetching optimizations are not applied. Where direct measurements of instruction cache miss penalties are not available, the prefetcher subsystem 230 can compute whether prefetching optimizations would likely benefit execution of the application. For example, the prefetcher subsystem 230 can add the sizes of all the "hot" blocks identified in the profiled code 225 to compute a total working size for the application. The total working size can be compared to a threshold capacity determined according to the prefetch latency 215 and prefetch chunk size 217. For example, the CPU architecture of the actual or assumed execution environment for the application indicates that instructions can be prefetched into one or both of both L1 instruction cache and L2 cache, which can together define the effective capacity of instruction cache (or instruction cache capacity can be defined in other manners, for example, as described above). The threshold can then be determined accordingly according to (e.g., as double or some other function of) the effective instruction cache capacity. For example, the more "hot" blocks there are in the application code 223 as compared to the effective instruction cache, the greater the likelihood may be for instruction cache misses and resulting penalties. If the total working size is larger than the threshold, the prefetcher subsystem 230 can determine that prefetching optimizations should be applied. Otherwise, the prefetcher subsystem 230 can determine not to apply the prefetching optimizations.

Embodiments of the prefetcher subsystem 230 attempt to schedule prefetch instructions within the application code 223 according to both the profiled code 225 and the coverable latency 215. In some implementations, the profiled code 225 is linearized into a set of execution traces. For example, the "hot" code regions indicated by the profiled code 225 are arranged into linear traces in such a way that execution will tend to be sequential to the extent possible. The linearization can be performed according to control flow graph information, function call graph information, edge probabilities, and/or any other suitable information. The execution traces can be generated by following the profiled code 225 in a forward execution direction. Accordingly, each trace can have one or more predecessor traces and one or more successor traces.

Embodiments of the prefetcher subsystem 230 traverse the profiled code 225 in reverse to determine appropriate locations at which to insert prefetching instructions. In some implementations, an exit point of an execution trace (e.g., a last instruction of a trace) is identified. The execution trace is traversed in reverse (e.g., instruction by instruction in reverse linearized order), while keeping track of an instruction latency covered by each traversed instruction (i.e., an amount of time the instruction will take to execute at runtime). According to some embodiments, as the instructions are traversed in reverse, their respective instruction latencies are accumulated until the accumulated instruction latency exceeds the prefetch latency 215. A prefetch instruction can be scheduled according to determining the location at which the prefetch latency 215 is exceeded (e.g., a prefetch instruction is inserted ahead of the last-traversed instruction). For example, starting at the top of an instruction chunk (e.g., the first instruction in a chunk of instructions sized according to the prefetch chunk size 217), the preceding instructions of the trace are traversed in reverse until the accumulated instruction latency exceeds the prefetch latency 215, at which point a prefetch instruction is scheduled in the code. The scheduled prefetch instruction points to (e.g., has a target address corresponding to) the instruction block, so that the prefetch instruction will start to prefetch the instruction block at least a prefetch latency 215 before those instructions are needed for application execution. The prefetcher subsystem 230 can continue to traverse each execution trace in reverse, scheduling prefetches along the way. At the top of each execution trace, the predecessor trace can be identified according to the control flow graph, the function call graph, the linearization process, or in any suitable manner.

One implementation is shown by the following illustrative pseudo-code:

```
for each identified execution trace {
    generate (trace_size / prefetch_chunk_size) prefetches;
    for each generated prefetch {
        traverse control flow graph for application code in reverse using profile information to
        locate likely predecessor(s);
        accumulate instruction latencies during reverse traversal from start of each instruction
        chunk;
        if accumulated instruction latency from each instruction chunk > prefetch latency {
            insert prefetch at or before current point targeting instruction chunk
        }
        else {
            continue upward traversal
        }
    }
}
```

Suppose "trace_size" (a size of the execution trace) is two-hundred instructions, and the "prefetch_chuck_size" (prefetch chunk size 217) is twenty instructions. Implementations count inserted prefetch instruction as additional instructions in the trace, so that each twenty-instruction chunk includes up to nineteen instructions from the profiled code 225 and one prefetch instruction. Accordingly, the pseudocode can generate ten (i.e., 200/19) prefetches for scheduling, and the first of those prefetches can be scheduled at least a prefetch latency 215 amount of accumulated instruction latency ahead of the last instruction chunk in the execution trace. After traversing the entire profiled code 225 and scheduling prefetches as appropriate, the prefetcher subsystem 230 can output the modified application code 235. Various embodiments include additional functionality to account for particular scenarios, such as when a coverable latency 215 spans multiple execution traces, when a coverable latency 215 falls within a small loop body, etc.

Figure 3:
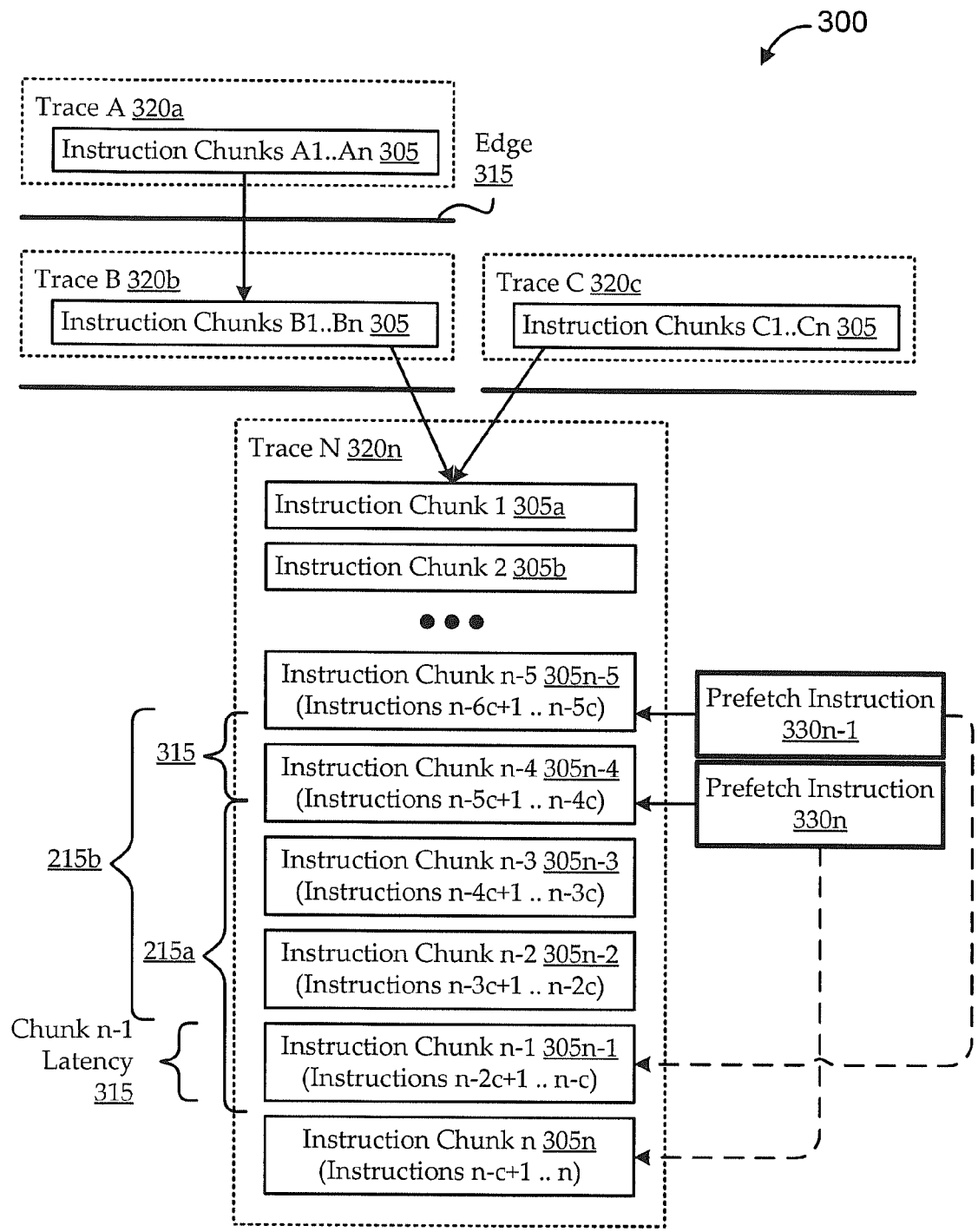
FIG. 3 shows an illustrative code segment having a number of execution traces, according to various embodiments.
Figure 4A:
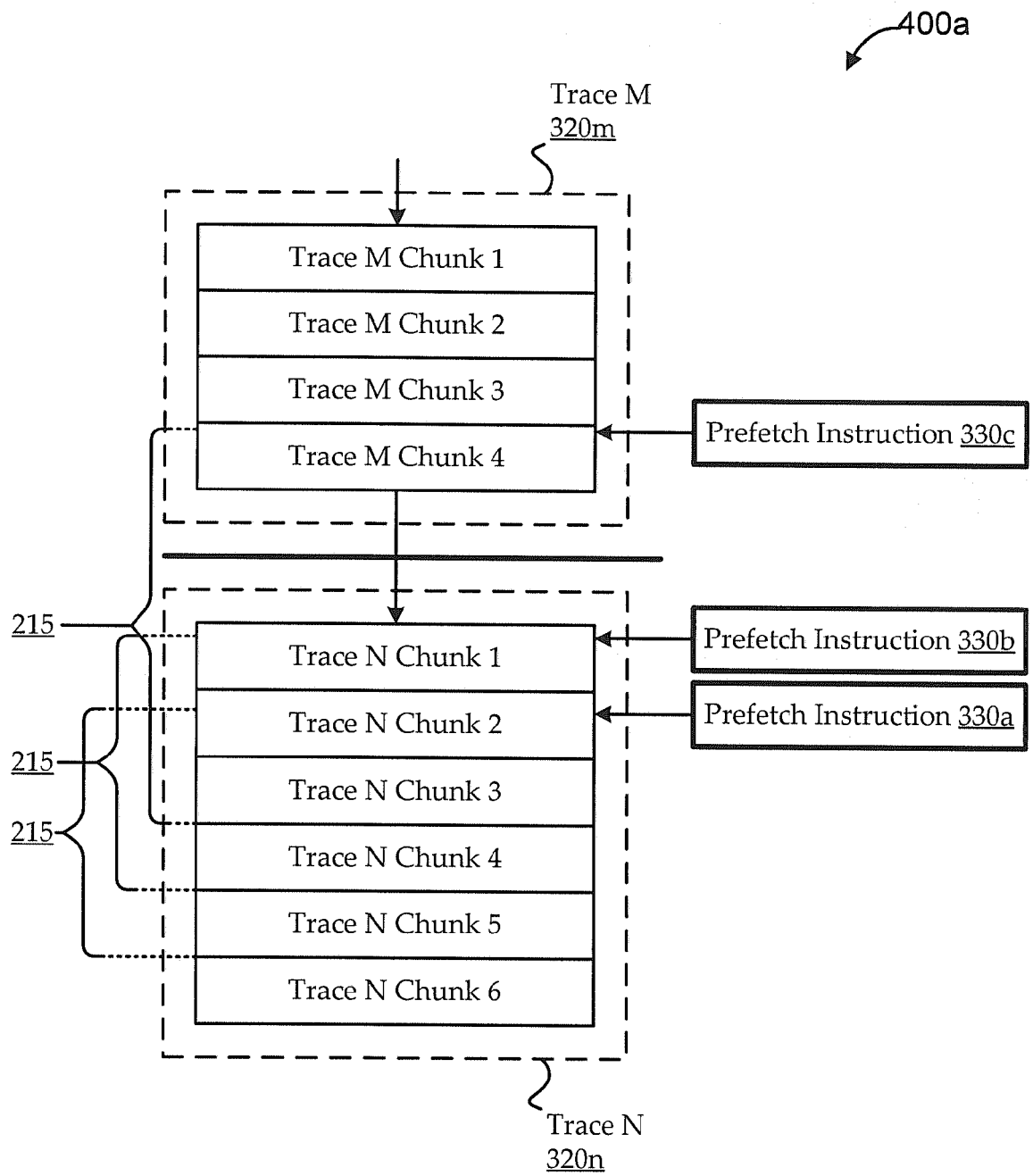
FIG. 4A shows another illustrative code segment having a number of execution traces, according to various embodiments.
Figure 4B:
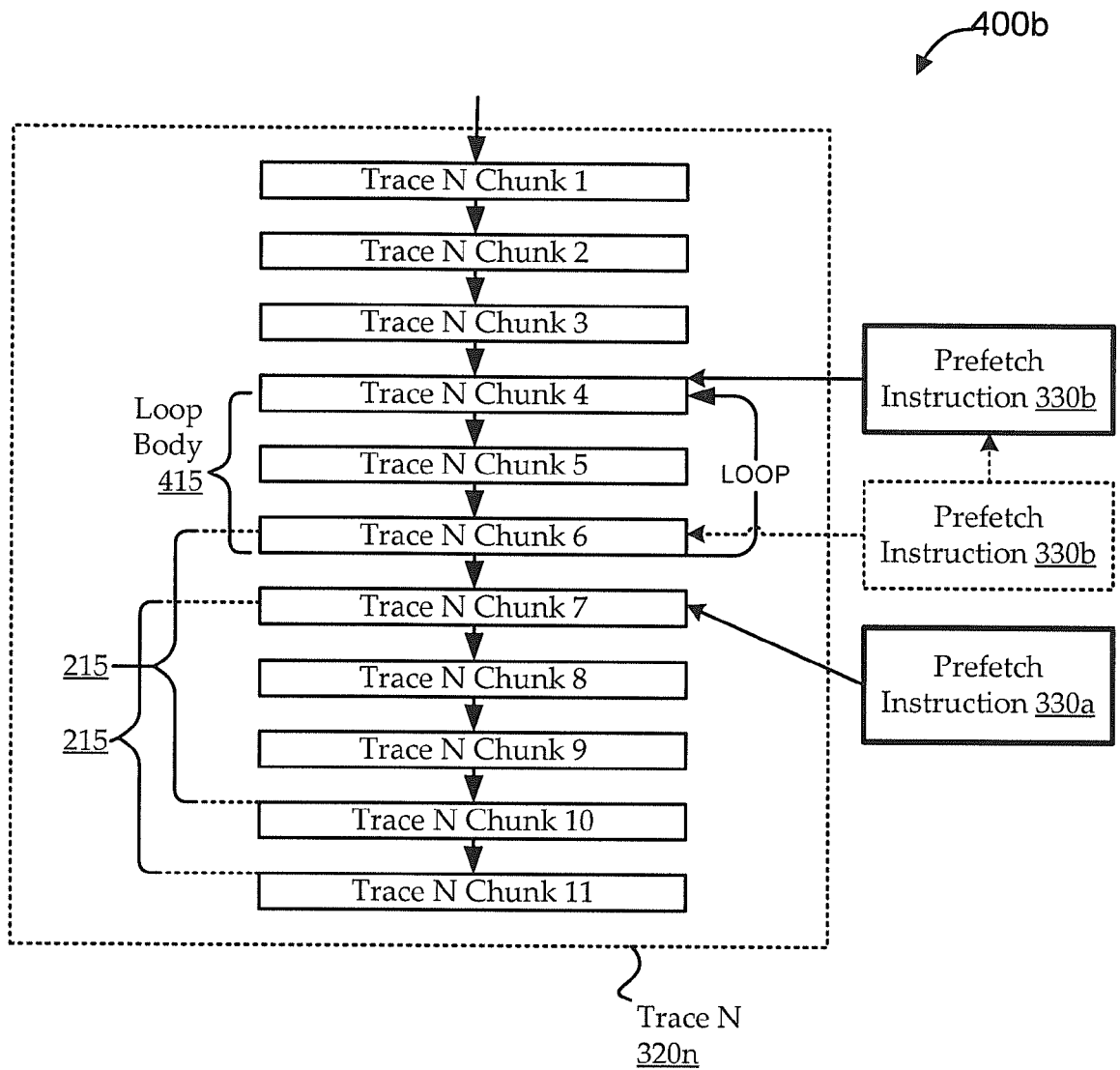
FIG. 4B shows yet another illustrative code segment having an execution trace that includes a loop, according to various embodiments.

Certain of these scenarios are illustrated in FIGS. 3-4B. FIG. 3 shows an illustrative code segment 300 having a number of execution traces 320, according to various embodiments. As illustrated, "Trace A" 320a calls "Trace B" 320b, and "Trace B" 320b and "Trace C" 320c both call "Trace N" 320n. For the sake of clarity, an edge 315 is illustrated as defining boundaries between the execution traces 320. Each execution trace 320 includes a number of instruction chunks 305 (e.g., "Chunk 1" through "Chunk n"), each including a number of instructions (e.g., sixteen, four-byte instructions). Each execution trace 320 ends in a trace exit point (e.g., the last application instruction of the last instruction chunk 305 in the execution trace 320).

For the sake of illustration, "Trace N" 320n includes "n" instruction chunks 305a . . . n, each having "c" instructions ("c" is the prefetch chunk size 217), so that the last instruction chunk 305n includes application instructions n-c+1 . . . n (e.g., if "Trace N" 320n includes 200 instructions, and each instruction chunk 305 includes 16 instructions, the last instruction chunk 305n includes application instructions 185 through 200). Embodiments (e.g., of the prefetcher subsystem 230 of FIG. 2) traverse "Trace N" 320n in an upward direction from the top of instruction chunk 305n until the prefetch latency 215 is exceeded. As illustrated, a prefetch latency 215 is exceeded somewhere in the middle of instruction chunk 305n-4, for example, when application instruction n-4c–3 is traversed (i.e., at runtime, it is estimated that application instruction n-4c–3 will begin to be executed at least a prefetch latency 215 before application instruction n-c+1 (the first application instruction of target instruction chunk 305n) begins to be executed). A prefetch instruction 330n can be inserted immediately before (or at some other location before) the last-traversed instruction (e.g., application instruction n-4c–3). In some implementations, prefetch instruction 330n is now included in the application code as an instruction, for example, at position n-4c–4 of Trace N 320n. Accordingly, when the application code is executed, prefetch instruction 330n is scheduled to execute in time to start prefetching the instructions of instruction chunk 305n at least a prefetch latency 215 before they are needed for application execution.

Embodiments estimate the accumulated latency of all the application instructions in instruction chunk 305n-1 (the second-to-last instruction chunk in the trace) while traversing Trace N 320n in the upward direction. This accumulated latency for the chunk is illustrated as "Chunk n-1 Latency" 315. For example, if instruction chunk 305n-1 includes sixteen instructions (application instructions n-2c+1 . . . n-c) that are estimated to take 100 cycles to execute, the chunk n-1 latency 315 can be considered 100 cycles. While all the instruction chunks 305 are illustrated as being the same size, they may not all have the same associated chunk latencies. For example, even though each instruction chunk 305 may have the same number of application instructions, different application instructions can have different associated execution latencies.

As the traces continue to be traversed in reverse, prefetch instructions 330 continue to be scheduled at least a prefetch latency 215 before their target instruction chunks 305. For example, to ensure that the instruction chunk 305n-1 instructions are prefetched in time for execution, they can be prefetched at least a prefetch latency 215 before they begin. In some implementations, prefetching of the instruction chunk 305n-1 instructions occurs a chunk n-1 latency 315 sooner than prefetching of the instruction chunk 305n instructions.

As illustrated, another prefetch instruction 330n-1 is inserted approximately a chunk n-1 latency 315 ahead of the first inserted prefetch instruction 330n (e.g., ahead of application instruction n-5c–6). This scheduling can vary in different implementations. In one such implementation, the scheduling is adjusted to account for the first added prefetch instruction 330n. For example, as illustrated instruction chunk 305n-4 includes an additional instruction after prefetch instruction 330n has been inserted. In other such implementations, the scheduling is adjusted in other ways. For example, prefetch instruction 330n can be moved closer to the location of prefetch instruction 330n-1 or in other such manners, while still scheduling the prefetch instructions at least a prefetch latency 215 ahead of their target instruction chunks 305.

In some embodiments, prefetch instructions 330 are additionally and/or alternatively scheduled according to confidence levels. Profiling of the application code (e.g., as described above with reference to FIG. 2) can indicate a probability associated with each edge 315 that indicates how likely the application is to take one branch direction over another (e.g., a statistical or probabilistic confidence level). For example, when the top of Trace N 320n is reached, an edge 315 is encountered. This edge 315 follows the exit points of both Trace B 320b and Trace C 320c, each of which having some associated likelihood of begin the predecessor to Trace N 320n. As multiple edges 315 are crossed, embodiments track a confidence level with respect to the associated edge probabilities, and can schedule (e.g., add, adjust, etc.) prefetch instructions 330 accordingly. For example, an implementation tracks how many edges 315 are crossed that have less than a 25-percent edge probability, or edge probabilities are accumulated into a total confidence value over a number of edges 315.

Turning to FIG. 4A, another illustrative code segment 400a is shown having a number of execution traces 320, according to various embodiments. As illustrated, Trace M 320m with five instruction chunks 305 calls Trace N 320n with six instruction chunks 305. For the sake of simplicity, the prefetch latency 215 is illustrated as less than the accumulated latency of four instruction chunks 305. Traversal of the code segment 400a can begin at "Trace N Chunk 6" (the exit point of the last trace) and can move upward. As each application instruction of each instruction chunk 305 is traversed, its instruction latency is accumulated. After traversing from the top of "Trace N Chunk 6" through most of "Trace N Chunk 2," the accumulated latency the application instructions has exceeded the prefetch latency 215. Accordingly, a first prefetch instruction 330a (that prefetches the instructions of "Trace N Chunk 6") can be inserted somewhere near the beginning of "Trace N Chunk 2," as shown (e.g., ahead of the last-traverse instruction when the prefetch latency 215 was exceeded by the accumulated instruction latency). Traversal of the code segment 400a continues from the inserted prefetch instruction 330a until the accumulated latency from the top of "Trace N Chunk 5" again exceeds the prefetch latency 215 (e.g., including the latency of inserted prefetch instruction 330a). This may precede the location of prefetch 330a by approximately the accumulated latency of "Trace N Chunk 5." A second prefetch instruction 330b can be inserted at this location, as shown.

Once again, traversal of the code segment 400a continues from the second inserted prefetch instruction 330b until the accumulated latency from the top of "Trace N Chunk 4" again exceeds the prefetch latency 215 (e.g., including the latency of inserted prefetch instruction 330b). This may precede the location of prefetch 330b by approximately the accumulated latency of "Trace N Chunk 4." As illustrated, however, the remaining instruction chunks 305 of Trace N 320n do not provide sufficient accumulated latency to exceed the prefetch latency 215. In some implementations, a prefetch instruction 330 is inserted at the beginning of the execution trace 320, even though the coverable latency 215 has not yet been exceeded. In other implementations, the traversal continues into the predecessor execution trace 320 (e.g., "Trace M" 320m in the illustrated scenario). For example, when the upward traversal reaches the top block of "Trace N" 320n, the function call graph (FCG) of the application is used to determine that "Trace M" 320n is the predecessor execution trace 320 (or, at least, the most likely predecessor execution trace 320). Thus, both the control flow graph of the execution traces 320 and the FCG of the application are used. As illustrated, the upward traversal continues into "Trace M" 320m until the prefetch latency 215 is exceeded. As illustrated, this may occur somewhere near the beginning of "Trace M Chunk 4." A third prefetch instruction 330c can be inserted at that point, as shown.

FIG. 4B shows yet another illustrative code segment 400b having an execution trace 320 that includes a loop, according to various embodiments. As illustrated, "Trace N" 320n has eleven instruction chunks 305, including a loop body 415 that spans three of the instruction chunks 305. Again, for the sake of simplicity, the prefetch latency 215 is illustrated as less than the accumulated latency of four instruction chunks 305. Traversal of the code segment 400b can begin at "Trace N Chunk 11" (the exit point) and can move upward. As each application instruction of each instruction chunk 305 is traversed, its instruction latency is accumulated. After traversing from the top of "Trace N Chunk 11" through most of "Trace N Chunk 7," the accumulated latency the application instructions has exceeded the prefetch latency 215. Accordingly, a first prefetch instruction 330a (that prefetches the instructions of "Trace N Chunk 11") can be inserted somewhere near the beginning of "Trace N Chunk 7," as shown (e.g., ahead of the last-traverse instruction when the prefetch latency 215 was exceeded by the accumulated instruction latency).

Traversal of the code segment 400b continues from the inserted prefetch instruction 330a until the accumulated latency from the top of "Trace N Chunk 10" again exceeds the prefetch latency 215 (e.g., including the latency of inserted prefetch instruction 330a). This may precede the location of prefetch instruction 330a by approximately the accumulated latency of "Trace N Chunk 10." If another prefetch instruction 330b were inserted at this location (e.g., somewhere toward the beginning of "Trace N Chunk 6"), it would fall within the loop body 415. This is undesirable in some implementations, as the prefetch instruction 330b would execute with each iteration of the loop, repeatedly prefetching the same instructions. In some implementations, the prefetch instruction 330b is inserted instead in a location outside the loop body 415. For example, as illustrated, the prefetch instruction 330b is inserted instead in a loop pre-header (e.g., illustrated as near the beginning "Trace N Chunk 3") or in a block that dominates the loop header. Alternatively, the prefetch instruction 330b can be placed in any suitable location before or after the loop body 415. In some implementations, for example in case of a very large loop body 415, the prefetch instruction 330b can be inserted in the loop body. Certain such implementations schedule the prefetch instructions 330 within a loop body 415 in such a way that they rotate around the loop, causing each prefetch instruction 330 to look ahead by a fixed number of cycles. If prefetches were scheduled without regard for the loop body 415, it is possible that additional prefetch instructions 330 (e.g., targeted at "Trace N Chunk 10," "Trace N Chunk 9," etc.) would also fall within the loop body 415. In some implementations, all these prefetch instructions 330 could be stacked at the beginning of the loop body 415 or in any other suitable location.

Some embodiments handle additional scenarios other than those shown in FIGS. 3-4B. For example, according to certain embodiments, the traversal is not repeated in entirety for each inserted prefetch instruction 330. Instead, subsequent prefetches for a same block of code (e.g., instruction, number of bytes, etc.) use the path(s) already found for a previous prefetch instruction 330. In some instances, the traversal can "fork," so that multiple prefetch instructions 330 are inserted for a given instruction if multiple "hot" paths to that instruction exist. If the paths re-merge, however, the prefetches can merge as well. As prefetch instructions 330 are inserted, they can be merged (or become redundant) if the target instructions are already prefetched. Accordingly, some implementations check for duplicate prefetch instructions 330 (or at least prefetches of duplicate application instructions) and remove them. Non-duplicate prefetches can be scheduled into any available empty slots in the instruction schedule. As will be appreciated from the above descriptions, prefetch instructions 330 can be spaced to accommodate a rate at which the processor model supports outstanding requests. For example, the total rate is determined by including the prefetch instructions in the calculation.

Figure 5:
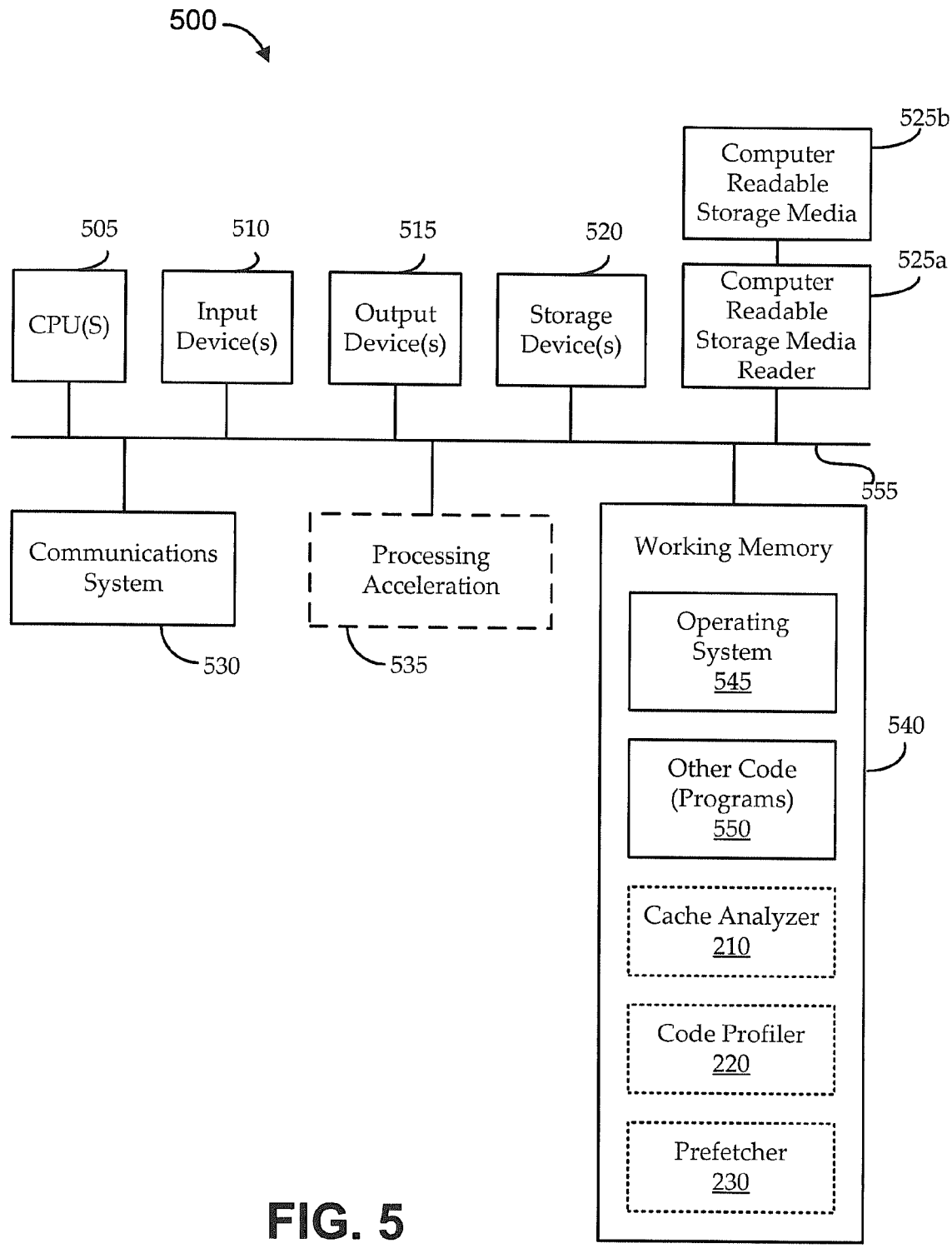
FIG. 5 shows an illustrative computational system for implementing one or more systems or components of systems, according to various embodiments.

FIG. 5 shows an illustrative computational system 500 for implementing one or more systems or components of systems, according to various embodiments. The computational system 500 is described as implementing functionality of an illustrative system for reducing instruction cache miss penalties, like the system 200 described with reference to FIG. 2. Embodiments of the computational system 500 can be implemented as or embodied in single or distributed computer systems, or in any other useful way.

The computational system 500 is shown including hardware elements that can be electrically coupled via a bus 555. The hardware elements can include one or more central processing units (CPUs) 505, one or more input devices 510 (e.g., a mouse, a keyboard, etc.), and one or more output devices 515 (e.g., a display, a printer, etc.). The computational system 500 can also include one or more storage devices 520. By way of example, storage device(s) 520 can be disk drives, optical storage devices, solid-state storage device such as a random access memory (RAM) and/or a read-only memory (ROM), which can be programmable, flash-updateable and/or the like. In some embodiments, the storage devices 520 are configured to store versions of application code and/or other useful information for facilitating functionality described herein.

The computational system 500 can additionally include a computer-readable storage media reader 525a, a communications system 530 (e.g., a modem, a network card (wireless or wired) or chipset, an infra-red communication device, etc.), and working memory 540, which can include RAM and ROM devices as described above. In some embodiments, the computational system 500 can also include a processing acceleration unit 535, which can include a DSP, a special-purpose processor and/or the like.

The computer-readable storage media reader 525a can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information. The communications system 530 can permit data to be exchanged with a public or private network and/or any other system.

The computational system 500 can also include software elements, shown as being currently located within a working memory 540, including an operating system 545 and/or other code 550, such as an application program (which can be a client application, web browser, mid-tier application, relational database management system (RDBMS), etc.). As illustrated, a cache analyzer 210, a code profiler 220, and/or a prefetcher 230 can be implemented as applications in working memory 540. Each of these applications can also include various stored information, as described above.

It should be appreciated that alternate embodiments of a computational system 500 can have numerous variations from that described above. For example, customized hardware might also be used and/or particular elements might be implemented in hardware, software (including portable software, such as applets), or both. Further, connection to other computing devices such as network input/output devices can be employed. In various embodiments a computational system 500 like the one illustrated in FIG. 5 is used to implement one or more functions of the systems described above, and the computational system 500 can be in communication with other functional components as needed or desired. In other embodiments, computational systems 500 like the one illustrated in FIG. 5 are used to implement one or more methods of the system, such as those described below.

Figure 6:
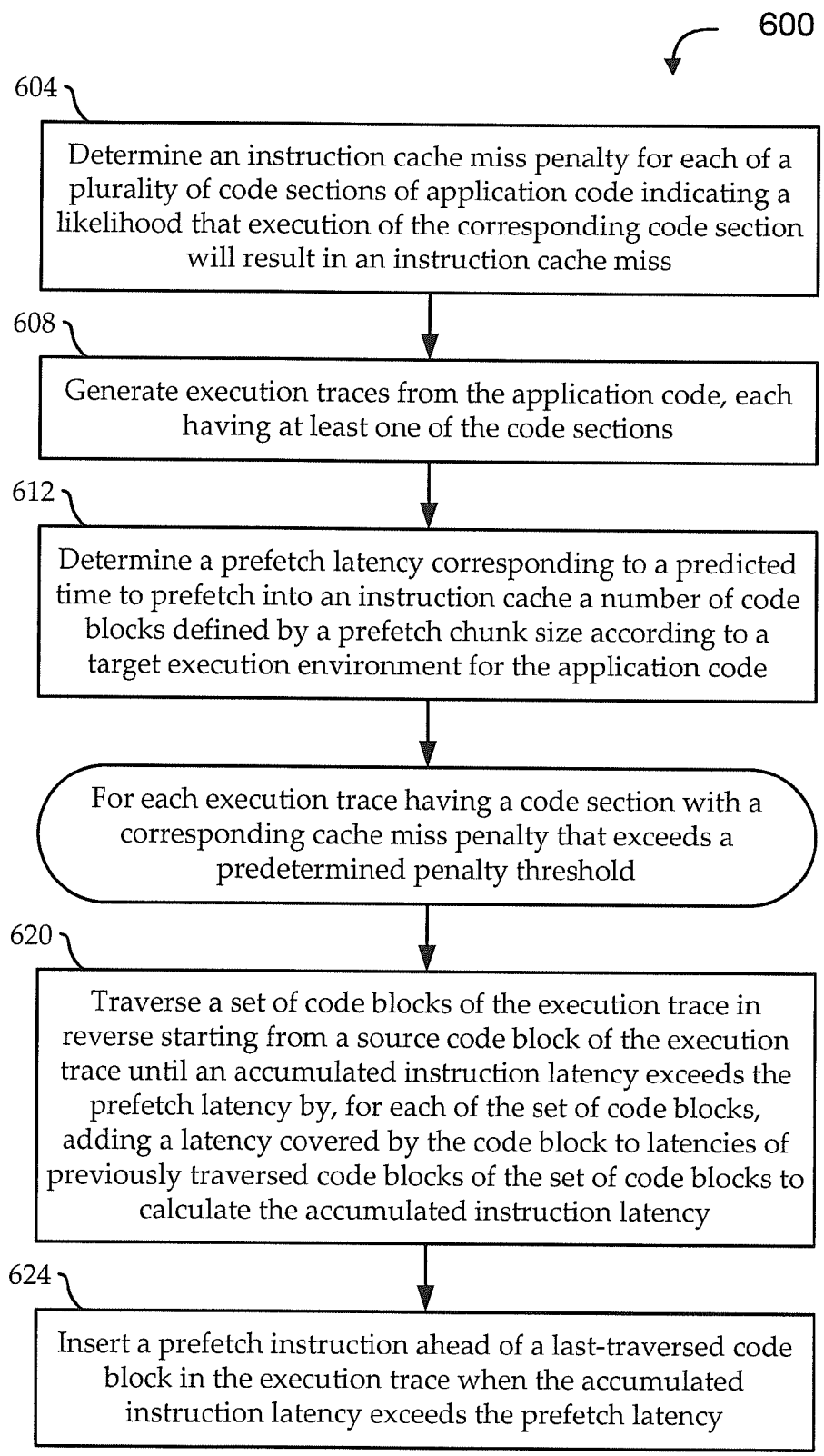
FIG. 6 shows a flow diagram of an illustrative method for reducing instruction cache miss penalties, according to various embodiments.

Turning to FIG. 6, a flow diagram is provided of an illustrative method 600 for reducing instruction cache miss penalties, according to various embodiments. Embodiments of the method 600 begin at stage 604 by determining an instruction cache miss penalty for each of a number of code sections of application code. The instruction cache miss penalty indicates a likelihood that execution of the corresponding code section is likely to result in an instruction cache miss. For the sake of illustration, it is calculated that every time the application code is executed, the particular code section (e.g., a function, code region, code block, etc.) has an 85-percent likelihood of executing as part of the application. The instruction cache miss penalty can be expressed as 85 percent (likely to run), as 15 percent (likely not to run), as "hot" (e.g., a substantially binary determination or whether or not the code section is sufficiently likely according to some threshold or other function), or in any other suitable manner.

The instruction cache miss penalties can be determined in any suitable manner, for example, as described above with reference to FIG. 2. In some implementations, the instruction cache miss penalty for each code section is determined by profiling each code section using a hardware counter based profiler to calculate the likelihood that execution of the corresponding code section is likely to result in an instruction cache miss. For example, the program executes one or more times, and the hardware counter based profiler calculates a likelihood that the corresponding code section will be executed during execution of the application code. Alternatively, the hardware counter based profiler is used to directly identify where instruction cache misses occur and/or how often they occur. In other implementations, the instruction cache miss penalty for each code section is determined by identifying each code section as likely to result in an instruction cache miss during execution when the code section is targeted by a programmer user for instruction prefetching. For example, a programmer can include source annotations or other indications in the code during building of the application code to explicitly indicate a "hot" code section or the like. Alternatively, the programmer can indicate that the corresponding code section is unlikely to be executed during execution of the application code (e.g., that the code section is "cold"). In still other implementations, the instruction cache miss penalty for each code section is determined by using feedback directed optimization to empirically calculate a likelihood that the corresponding code section will be executed during execution of the application code.

At stage 608, execution traces are generated from the application code. Each execution trace can include at least one of the code sections. For example, the application code is linearized into an application instruction execution schedule composed of execution traces. At stage 612, a prefetch latency is determined corresponding to a predicted time to prefetch into an instruction cache a number of code blocks defined by a prefetch chunk size according to a target execution environment for the application code. For example, an instruction cache has 64-byte cache lines, and it is estimated to take approximately 600 clock cycles to retrieve an instruction from main memory into the instruction cache. Accordingly, the prefetch chunk size can be considered 64 bytes (e.g., or 16 4-byte instructions), and the prefetch latency can be considered 600 clock cycles. These values can be determined based on default values, CPU architectures of an actual or assumed execution environment, or in any other suitable manner.

Embodiments of the method 600 proceed with stages 620 and 624 for each execution trace having a code section with a corresponding instruction cache miss penalty that exceeds a predetermined penalty threshold. For example, the method 600 proceeds for any execution trace having an instruction cache miss penalty of greater than 75 percent, an instruction cache miss penalty indicated as "hot," etc. Some embodiments further determine whether to proceed by computing whether instruction prefetching is likely to reduce instruction cache miss penalties and by performing stages 620 and 624 only when instruction prefetching is likely to reduce those instruction cache miss penalties. In some such implementations, a total working size is calculated for all execution traces determined to have a code section with a corresponding instruction cache miss penalty that exceeds the predetermined threshold. It can then be determined that instruction prefetching is likely to reduce instruction cache miss penalties when the total working size exceeds a threshold size predetermined according to a capacity of at least one target cache (e.g., the effective instruction cache capacity).

At stage 620, a set of code blocks of the execution trace is traversed in reverse starting from a source code block of the execution trace until an accumulated instruction latency exceeds the prefetch latency. For each code block, a latency covered by the code block is added to latencies of previously traversed code blocks of the set of code blocks to calculate the accumulated instruction latency. At stage 624, a prefetch instruction is inserted ahead of a last-traversed code block in the execution trace when the accumulated instruction latency exceeds the prefetch latency. Implementations group the code blocks into instruction chunks according to the prefetch chunk size and iterate stages 620 and 624 to schedule a prefetch instruction to target each instruction chunk. In effect, each prefetch instructions can be scheduled at least a prefetch latency ahead of its target instruction chunk so that the instructions of the instruction chunk are prefetched in time for their execution at runtime.

In some implementations, each execution trace has a sequence of instruction chunks each having the number of code blocks defined by the prefetch chunk size. The source code block is a last code block of a second instruction chunk (e.g., a second-to-last instruction chunk of an execution trace) that directly precedes a first instruction chunk (e.g., a last instruction chunk of the execution trace). The prefetch instruction can be inserted ahead of the last-traversed code block in the execution trace in stage 624 by inserting the prefetch instruction as a first prefetch instruction that prefetches the first instruction chunk, thereby scheduling at least the prefetch latency between execution of the first prefetch instruction and execution of a first code block of the first instruction chunk. In some such implementations, the source code block is then reset to a last code block of a third instruction chunk (e.g., a second-to-last instruction chunk of the execution trace) that directly precedes the second instruction chunk (e.g., the second-to-last instruction chunk of the execution trace). The set of code blocks of the execution trace continues to be traversed in reverse until the accumulated instruction latency from the reset source block again exceeds the prefetch latency. A second prefetch instruction that prefetches the second instruction chunk in the execution trace is inserted according to where the accumulated instruction latency from the reset source block exceeds the prefetch latency, thereby scheduling at least the prefetch latency between execution of the second prefetch instruction and execution of a first code block of the second instruction chunk. In other such implementations, the execution trace is considered a first execution trace. The source code block is reset to a last code block of a third instruction chunk that directly precedes the second instruction chunk, and the set of code blocks of the first execution trace continues to be traversed in reverse until a starting point of the execution trace is reached without the accumulated instruction latency from the reset source block exceeding the prefetch latency. A second execution trace of the application code can be identified that is a predecessor of the first execution trace according to a function call graph of the application code. The set of code blocks of the second execution trace can continue to be traversed in reverse from a last code block of the second execution trace until the accumulated instruction latency from the reset source block exceeds the prefetch latency, and a second prefetch instruction that prefetches the second instruction chunk in the first execution trace can be inserted according to where the accumulated instruction latency from the reset source block exceeds the prefetch latency, thereby scheduling at least the prefetch latency between execution of the second prefetch instruction and execution of a first code block of the second instruction chunk.

When inserting the prefetch instruction ahead of the last-traversed code block in the execution trace at stage 624, it may be determined that the last-traversed code block is inside a body of a loop having a pre-header. In those instances, some embodiments insert the prefetch instruction in the pre-header of the loop. Other embodiments insert the prefetch instruction in the loop body, particularly where the loop body is large. Some implementations calculate an edge confidence level at each edge defined by a function call graph. For example, the function call graph defines edges between each execution trace (as a child execution trace) and other execution traces (as parent execution traces) in a hierarchy of execution traces, and the edge confidence levels indicate likelihoods that the child execution trace will be called by each of its parent execution traces. An accumulated confidence level can be calculated as a function of the edge confidence level of each edge crossed while traversing the set of code blocks of the execution trace in reverse at stage 620. At stage 624, the prefetch instruction can be inserted after a last-traversed edge when the accumulated confidence level falls below a predetermined confidence threshold before the accumulated instruction latency exceeds the prefetch latency.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for reducing instruction cache miss penalties in application code execution, the system comprising:
   a processor; and
   a non-transient storage medium having instructions stored thereon, which, when executed, cause the processor to instantiate a compiler comprising:
   a code profiler, operable to:
      determine an instruction cache miss penalty for each of a plurality of code sections of application code, the instruction cache miss penalty indicating a likelihood that execution of the corresponding code section in the target execution environment will result in an instruction cache miss; and
      generate execution traces from the application code, each execution trace comprising at least one of the plurality of code sections; and
   an instruction prefetcher operable, for each execution trace having a code section with a corresponding instruction cache miss penalty that exceeds a predetermined penalty threshold, to:
      traverse a set of code blocks of the execution trace in reverse starting from a source code block of the execution trace until an accumulated instruction latency exceeds a prefetch latency by, for each of the set of code blocks, adding a latency covered by the code block to latencies of previously traversed code blocks of the set of code blocks to calculate the accumulated instruction latency, the prefetch latency corresponding to a predicted time to prefetch into an instruction cache a number of code blocks defined by a prefetch chunk size; and
      insert an instruction prefetch ahead of a last-traversed code block in the execution trace when the accumulated instruction latency exceeds the prefetch latency.

2. The system of claim 1, wherein the computer-implemented code profiler comprises a hardware counter based profiler operable to calculate the likelihood that execution of the corresponding code section will to result in an instruction cache miss.

3. The system of claim 1, wherein the computer-implemented code profiler is operable to determine the instruction cache miss penalty for each of the plurality of code sections of the application code by identifying each code section as likely to result in an instruction cache miss during execution when the code section is targeted by a programmer user for instruction prefetching.

4. The system of claim 1, wherein:
   each execution trace comprises a sequence of instruction chunks each having the number of code blocks defined by the prefetch chunk size;
   the source code block is a last code block of a second instruction chunk that directly precedes a first instruction chunk; and
   the computer-implemented prefetcher is operable to insert the instruction prefetch as a first prefetch instruction that prefetches the first instruction chunk, thereby scheduling at least the prefetch latency between execution of the first prefetch instruction and execution of a first code block of the first instruction chunk.

5. The system of claim 4, wherein the computer-implemented prefetcher is further operable to:
   reset the source code block to a last code block of a third instruction chunk that directly precedes the second instruction chunk;
   continue traversing the set of code blocks of the execution trace until the accumulated instruction latency from the reset source block exceeds the prefetch latency; and
   insert a second instruction prefetch that prefetches the second instruction chunk in the execution trace according to where the accumulated instruction latency from the reset source block exceeds the prefetch latency, thereby scheduling at least the prefetch latency between execution of the second instruction prefetch and execution of a first code block of the second instruction chunk.

6. The system of claim 4, wherein the execution trace is a first execution trace, and the computer-implemented prefetcher is further operable to:
   reset the source code block to a last code block of a third instruction chunk that directly precedes the second instruction chunk;
   continue traversing the set of code blocks of the first execution trace until a starting point of the execution trace is reached without the accumulated instruction latency from the reset source block exceeding the prefetch latency;
   identify a second execution trace of the application code that is a predecessor of the first execution trace according to a function call graph of the application code;
   traverse the set of code blocks of the second execution trace from a last code block of the second execution trace until the accumulated instruction latency from the reset source block exceeds the prefetch latency; and
   insert a second instruction prefetch that prefetches the second instruction chunk in the first execution trace according to where the accumulated instruction latency from the reset source block exceeds the prefetch latency, thereby scheduling at least the prefetch latency between execution of the second instruction prefetch and execution of a first code block of the second instruction chunk.

7. The system of claim 1, further comprising:
   a computer-implemented cache analyzer operable to determine the prefetch latency and the prefetch chunk size according to cache characteristics of a target execution environment for the application code.

8. A computer-implemented method for reducing instruction cache miss penalties in application code execution, the method comprising:
   determining, at compile time, an instruction cache miss penalty for each of a plurality of code sections of application code, the instruction cache miss penalty indicating a likelihood that execution of the corresponding code section will result in an instruction cache miss;
   generating, at compile time, execution traces from the application code, each execution trace comprising at least one of the plurality of code sections;
   determining, at compile time, a prefetch latency corresponding to a predicted time to prefetch into an instruction cache a number of code blocks defined by a prefetch chunk size according to a target execution environment for the application code; and for each execution trace having a code section with a corresponding instruction cache miss penalty that exceeds a predetermined penalty threshold:

traversing, at compile time, a set of code blocks of the execution trace in reverse starting from a source code block of the execution trace until an accumulated instruction latency exceeds the prefetch latency by, for each of the set of code blocks, adding a latency covered by the code block to latencies of previously traversed code blocks of the set of code blocks to calculate the accumulated instruction latency; and inserting, at compile time, a prefetch instruction ahead of a last-traversed code block in the execution trace when the accumulated instruction latency exceeds the prefetch latency.

9. The computer-implemented method of claim 8, wherein determining the instruction cache miss penalty for each of the plurality of code sections of application code comprises:

profiling each code section using a hardware counter based profiler to calculate the likelihood that execution of the corresponding code section will result in an instruction cache miss.

10. The computer-implemented method of claim 9, wherein the hardware counter based profiler calculates the likelihood that execution of the corresponding code section will result in an instruction cache miss by calculating a likelihood that the corresponding code section will be executed during execution of the application code.

11. The computer-implemented method of claim 8, wherein determining the instruction cache miss penalty for each of the plurality of code sections of application code comprises:

identifying each code section as likely to result in an instruction cache miss during execution when the code section is targeted by a programmer user for instruction prefetching.

12. The computer-implemented method of claim 11, wherein the code section is targeted by a programmer user for instruction prefetching unless the code section includes an indication by the programmer user that the corresponding code section is unlikely to be executed during execution of the application code.

13. The computer-implemented method of claim 8, wherein determining the instruction cache miss penalty for each of the plurality of code sections of application code comprises:

using feedback directed optimization to empirically calculate a likelihood that the corresponding code section will be executed during execution of the application code.

14. The computer-implemented method of claim 8, further comprising:

computing whether instruction prefetching will reduce instruction cache miss penalties; and performing the traversing and inserting steps only when instruction prefetching will reduce instruction cache miss penalties according to the computing step.

15. The computer-implemented method of claim 14, wherein computing whether instruction prefetching will reduce instruction cache miss penalties comprises:

computing a total working size of all execution traces determined to have a code section with a corresponding instruction cache miss penalty that exceeds the predetermined threshold; and determining that instruction prefetching will reduce instruction cache miss penalties only when the total working size exceeds a threshold size predetermined according to a capacity of at least one target cache.

16. The computer-implemented method of claim 8, wherein:

each execution trace comprises a sequence of instruction chunks each having the number of code blocks defined by the prefetch chunk size;

the source code block is a last code block of a second instruction chunk that directly precedes a first instruction chunk; and inserting the prefetch instruction ahead of the last-traversed code block in the execution trace comprises inserting the prefetch instruction as a first prefetch instruction that prefetches the first instruction chunk, thereby scheduling at least the prefetch latency between execution of the first prefetch instruction and execution of a first code block of the first instruction chunk.

17. The computer-implemented method of claim 16, further comprising:

resetting the source code block to a last code block of a third instruction chunk that directly precedes the second instruction chunk;

continuing traversing the set of code blocks of the execution trace until the accumulated instruction latency from the reset source block exceeds the prefetch latency; and inserting a second prefetch instruction that prefetches the second instruction chunk in the execution trace according to where the accumulated instruction latency from the reset source block exceeds the prefetch latency, thereby scheduling at least the prefetch latency between execution of the second prefetch instruction and execution of a first code block of the second instruction chunk.

18. The computer-implemented method of claim 16, wherein the execution trace is a first execution trace, and further comprising:

resetting the source code block to a last code block of a third instruction chunk that directly precedes the second instruction chunk;

continuing traversing the set of code blocks of the first execution trace until a starting point of the execution trace is reached without the accumulated instruction latency from the reset source block exceeding the prefetch latency;

identifying a second execution trace of the application code that is a predecessor of the first execution trace according to a function call graph of the application code;

traversing the set of code blocks of the second execution trace from a last code block of the second execution trace until the accumulated instruction latency from the reset source block exceeds the prefetch latency; and inserting a second prefetch instruction that prefetches the second instruction chunk in the first execution trace according to where the accumulated instruction latency from the reset source block exceeds the prefetch latency, thereby scheduling at least the prefetch latency between execution of the second prefetch instruction and execution of a first code block of the second instruction chunk.

19. The computer-implemented method of claim 8, wherein, inserting the prefetch instruction ahead of the last-traversed code block in the execution trace comprises:

determining that the last-traversed code block is inside a body of a loop having a pre-header; and inserting the prefetch instruction in the pre-header of the loop.

20. The computer-implemented method of claim 8, wherein the execution trace is one of a plurality of execution traces, and further comprising:
- calculating, at each edge between a child execution trace in the plurality of execution traces and one or more parent execution traces in the plurality of execution traces as defined by a function call graph, an edge confidence level that the child execution trace will be called by each of its parent execution traces;
- calculating an accumulated confidence level as a function of the edge confidence level of each edge crossed while traversing the set of code blocks of the execution trace in reverse; and
- inserting the prefetch instruction after a last-traversed edge when the accumulated confidence level falls below a predetermined confidence threshold before the accumulated instruction latency exceeds the prefetch latency.

* * * * *

UNITED STATES PATENT AND TRADEMARK OFFICE
CERTIFICATE OF CORRECTION

PATENT NO. : 8,978,022 B2  
APPLICATION NO. : 13/738811  
DATED : March 10, 2015  
INVENTOR(S) : Kalogeropulos et al.

Page 1 of 1

It is certified that error appears in the above-identified patent and that said Letters Patent is hereby corrected as shown below:

In the specification

In column 5, lines 54-55, delete "and or" and insert -- and/or --, therefor.

In the claims

In column 17, line 30, in Claim 1, after "miss;" delete "and".

In column 17, line 33, in Claim 1, after "sections;" delete "and".

Signed and Sealed this
Twentieth Day of October, 2015

Michelle K. Lee
*Director of the United States Patent and Trademark Office*